US012730646B2

(12) United States Patent
Gago Alonso et al.

(10) Patent No.: US 12,730,646 B2
(45) Date of Patent: Sep. 8, 2026

(54) BRANCH TARGET BUFFER RUN-AHEAD

(71) Applicant: Microsoft Technology Licensing, LLC, Redmond, WA (US)

(72) Inventors: Julio Gago Alonso, Barcelona (ES); Santiago Galan, Molins de Rei (ES); Antonio Juan Hormigo, Barcelona (ES); Ivan Pizarro, Hospitalet de Llobregat (ES)

(73) Assignee: Microsoft Technology Licensing, LLC, Redmond, WA (US)

( * ) Notice: Subject to any disclaimer, the term of this patent is extended or adjusted under 35 U.S.C. 154(b) by 201 days.

(21) Appl. No.: 18/374,273

(22) Filed: Sep. 28, 2023

(65) Prior Publication Data

US 2025/0110882 A1 Apr. 3, 2025

(51) Int. Cl.
*G06F 9/30* (2018.01)
*G06F 9/38* (2018.01)

(52) U.S. Cl.
CPC .......... *G06F 9/3806* (2013.01); *G06F 9/3808* (2013.01); *G06F 9/3844* (2013.01)

(58) Field of Classification Search
CPC ..... G06F 9/3806; G06F 9/3808; G06F 9/3844
See application file for complete search history.

(56) References Cited

U.S. PATENT DOCUMENTS

| | | | | |
|---|---|---|---|---|
| 5,978,909 | A | 11/1999 | Lempel | |
| 7,493,480 | B2 * | 2/2009 | Emma | G06F 9/3806 712/240 |
| 10,664,280 | B2 * | 5/2020 | Pota | G06F 12/0875 |
| 11,550,588 | B2 | 1/2023 | Kalamatianos | |
| 2009/0049286 | A1 * | 2/2009 | Levitan | G06F 9/3804 712/237 |
| 2019/0303160 | A1 * | 10/2019 | Greenhalgh | G06F 9/3806 |
| 2023/0195468 | A1 * | 6/2023 | Bouzguarrou | G06F 9/3848 712/239 |

OTHER PUBLICATIONS

International Search Report and Written Opinion received for PCT Application No. PCT/US2024/043934, Dec. 9, 2024, 14 pages.
International Preliminary Report on Patentability (Chapter I) received for PCT Application No. PCT/US2024/043934, mailed on Apr. 9, 2026, 09 Pages.

* cited by examiner

*Primary Examiner* — Corey S Faherty
(74) *Attorney, Agent, or Firm* — Schwegman Lundberg & Woessner, P.A.

(57) ABSTRACT

Branch target buffer structures are provided. A device can include a hierarchy of branch target buffers storing entries corresponding to branch instructions, the hierarchy of branch target buffers including respective branch target buffers that have progressively slower access times. The device can include a first program counter configured to generate a first program counter value associated with a next instruction of an executing application. The device can include a second program counter configured to predict a second program counter value that is associated with a subsequent instruction of the executing application that is after the next instruction. The device can include first branch prediction circuitry configured to populate a branch target buffer of the branch target buffers based on the second program counter value.

19 Claims, 7 Drawing Sheets

660 — STORE, BY A HIERARCHY OF BRANCH TARGET BUFFERS ENTRIES CORRESPONDING TO BRANCH INSTRUCTIONS, THE HIERARCHY OF BRANCH TARGET BUFFERS INCLUDING RESPECTIVE BRANCH TARGET BUFFERS THAT HAVE PROGRESSIVELY SLOWER ACCESS TIMES

662 — GENERATE, BY A FIRST PROGRAM COUNTER, A FIRST PROGRAM COUNTER VALUE ASSOCIATED WITH A NEXT INSTRUCTION OF AN EXECUTING APPLICATION

664 — GENERATE, BY A SECOND PROGRAM COUNTER, A SECOND PROGRAM COUNTER VALUE THAT IS ASSOCIATED WITH A SUBSEQUENT INSTRUCTION OF THE EXECUTING APPLICATION THAT IS AFTER THE NEXT INSTRUCTION

666 — MOVE, BY BRANCH PREDICTION CIRCUITRY, AN ENTRY OF A BRANCH TARGET BUFFER OF THE BRANCH TARGET BUFFERS TO ANOTHER BRANCH TARGET BUFFER OF THE BRANCH TARGET BUFFERS BASED ON THE SECOND PROGRAM COUNTER VALUE

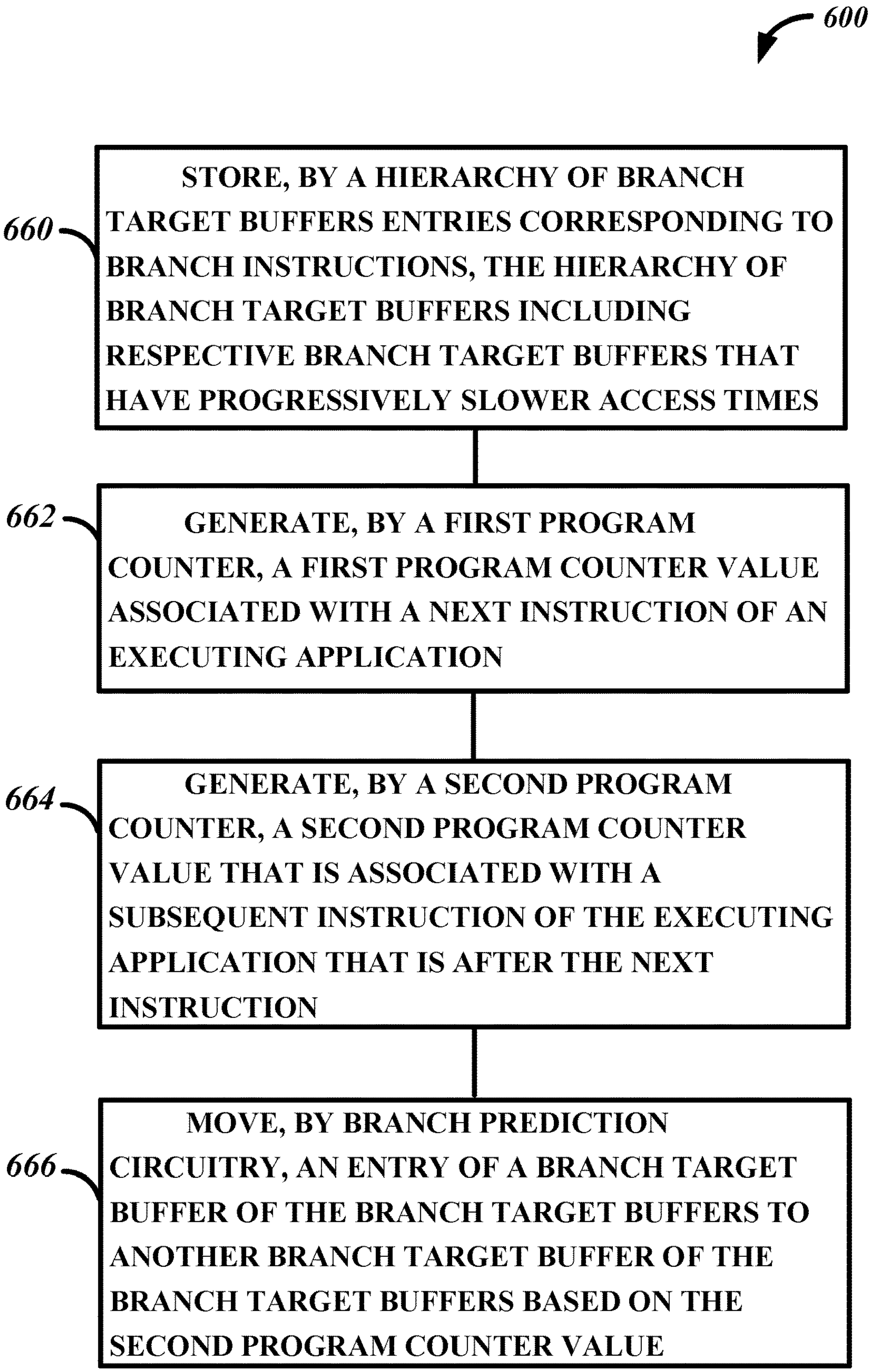

*FIG. 6*

BRANCH TARGET BUFFER RUN-AHEAD

BACKGROUND

In computing, processor pipeline designs benefit from trying to predict which next instruction will likely be executed following execution of a current instruction. Execution of the current instruction may result in a branch to one of two or more next instructions. Instruction branch speculation is used to determine the most likely next instruction, referred to as a target instruction.

Pipeline designs split computing operations into stages. Each stage is typically performed by dedicated hardware. An example computing pipeline includes stages (i) fetching an instruction, (ii) reading the instruction, (iii) decoding the instruction, (iv) executing the decoded instruction, (v) accessing memory to read operands from memory, and (vi) writing the results to the memory. Each of the stages relies on output of the prior stage to perform its operation. Instead of waiting for a first instruction to go through the entire pipeline, a next instruction begins to go through the pipeline before the first instruction is through the pipeline.

Traditionally, branch speculation is achieved by predicting the target of branches. Such targets can be fixed, for unconditional direct branches, variable, for indirect branches, dual (taken, non-taken), for conditional branches, or a combination of fixed, dual, or variable, when the instruction set architecture supports them.

To perform such prediction, different algorithms exist, which use dedicated storage (typically named Branch Target Buffers (BTBs)) to remember key details about branch location, type, and potential targets. Traditionally, performance is achieved by increasing the accuracy of such prediction. However, in certain workloads, capacity is also important, which is the ability to track and anticipate a large working set of branches, not necessarily difficult to predict with accuracy. The storage to track branches is typically made of several levels, with each level comprising several entries that outnumber, but are also slower than, the previous level. Increasing the storage capacity of branch prediction structures usually impacts the latency required to resolve such branches, which has an impact on performance.

SUMMARY

Circuits, devices, and methods for branch target buffer (BTB) entry anticipation and management are provided. BTB entries are anticipated by prediction circuitry that includes a dedicated program counter that runs ahead of a normal program counter. An entry that is predicted to be used can be moved to a BTB that has a faster access time relative to the prediction circuitry.

A device can include a hierarchy of branch target buffers storing entries corresponding to branch instructions, the hierarchy of branch target buffers including respective branch target buffers that have progressively slower access times. The device can include a first program counter and a second program counter. The first program counter can be configured to generate a first program counter value associated with a next instruction of an executing application. The second program counter can be configured to predict a second program counter value that is associated with a subsequent instruction of the executing application that is after the next instruction. First branch prediction circuitry of the device can be configured to populate a branch target buffer of the branch target buffers based on the second program counter value. The first branch prediction circuitry can be configured to populate a branch target buffer of the respective branch target buffers with a faster access time with an entry corresponding to the second program counter value and from a branch target buffer of the branch target buffers with a slower access time.

The device can further include first and second branch history registers. The first branch history register can store branch data associated with most recent branch instructions of the executing application in accord with the first program counter. The second branch history register can store branch data associated with most recent branch instructions of the executing application in accord with the second program counter.

The device can further include first and second return stack buffers. The first return stack buffer can be populated in accord with the first program counter value. The second return stack buffer can be populated in accord with the second program counter value. The second return stack buffer can store less data than the first return stack buffer.

The first branch prediction circuitry can operate based on the second program counter value when a compute pipeline that operates based on the first program counter value is stalled. The device can further include second branch prediction circuitry that operates based on the second program counter value. The second branch prediction circuitry can predict only a specified number of instructions past the next instruction. The first branch prediction circuitry can be configured to set the second program counter to the first program counter value when a compute pipeline that operates based on the first program counter value is stalled.

The device can further include a victim cache configured to receive an entry that has been evicted from a branch target buffer of the branch target buffers. The first branch prediction circuitry can be configured to access the victim cache responsive to receiving respective miss indications from each branch target buffer of the branch target buffers based on the second program counter value. The first branch prediction circuitry can be configured to populate a branch target buffer of the branch target buffers with an entry associated with the second program counter value form the victim cache.

BRIEF DESCRIPTION OF THE DRAWINGS

FIG. 6 illustrates, by way of example, a diagram of an embodiment of a method for branch target buffer run-ahead.

DETAILED DESCRIPTION

Figure 1:
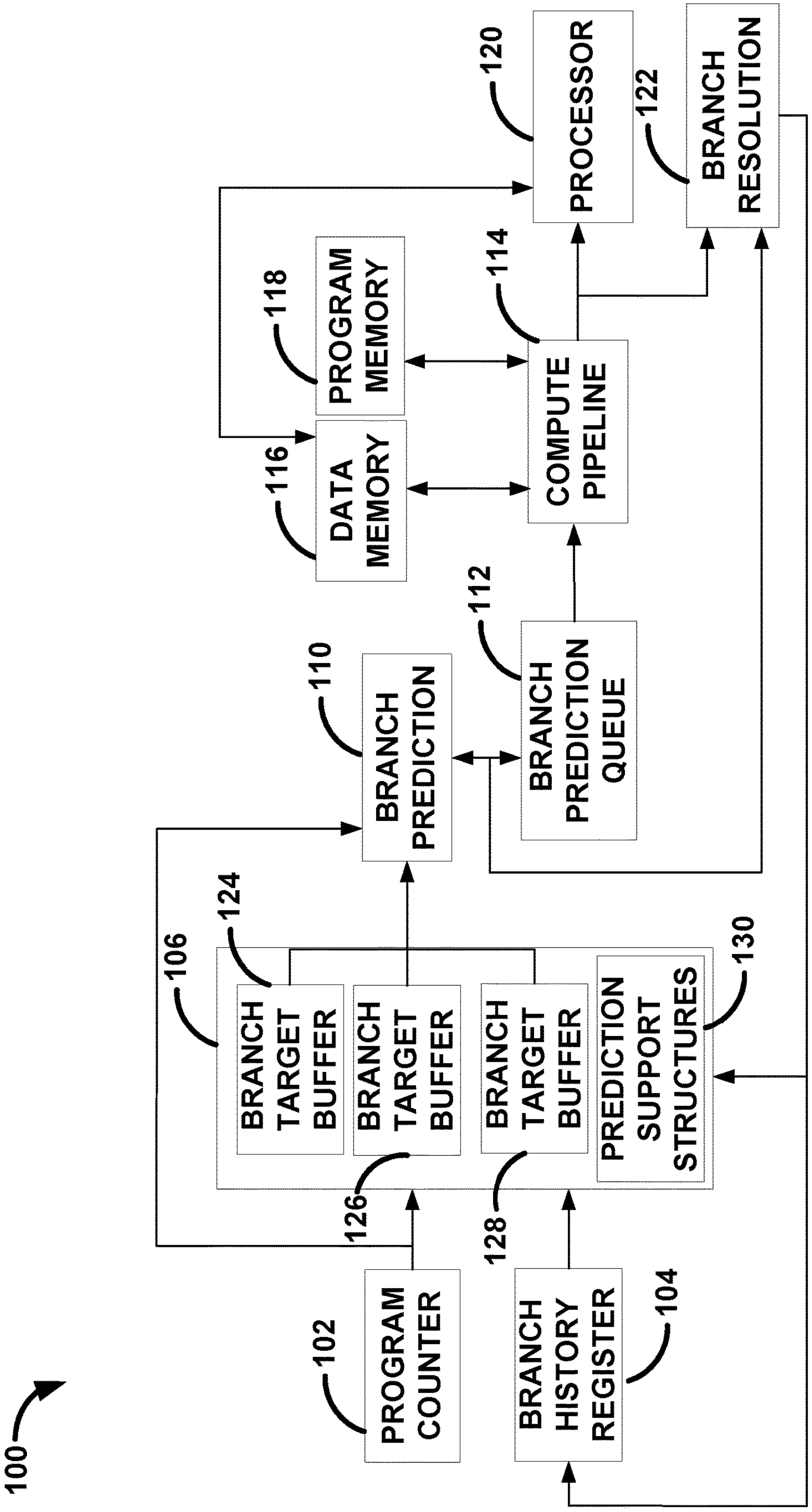
FIG. 1 illustrates, by way of example, a diagram of an embodiment of a system for branch target prediction.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

An improved branch target buffer operations can achieve both low latency and high capacity by anticipating branch prediction entries used in future predictions made by branch prediction circuitry. The anticipated branch predictions are brought from larger and slower levels of branch target buffers (BTBs) to smaller and faster levels of the BTBs where possible. Studies show that reducing the latency by only a few cycles can provide a substantial increase in performance. Running ahead of the branch prediction circuitry can help identify future branch predictions that can be brought to the smaller and faster levels of BTB to reduce latency.

For the description below, we can assume a design in which the branch prediction circuitry runs ahead of, and detached from, a compute pipeline. The branch prediction circuitry and compute pipeline are separated by a queue, which is called the branch prediction queue (BPQ) herein. The branch prediction pipeline iterates and follows a sequence of program counter (PC) values in the presence of branch instructions. Typical structures and algorithms are used to find and predict the target of branches in the instruction stream before fetching their bytes and decoding them, which happens in the compute pipeline downstream from the BPQ.

The improved branch buffer operation can include a second branch-prediction pipeline that runs ahead of the existing pipeline (ahead means anticipating later instructions to be executed). The second branch prediction pipeline anticipates entries missing in the predictor structures. The second branch prediction pipeline can provide an anticipated branch target that is not present in the predictor structures to the predictor structures, propagate an entry to a BTB that is faster to access than the BTB in which the entry currently resides, prefetch an entry from a BTB victim cache, a combination thereof, or the like. This run-ahead incurs additional energy, which can be compensated by the reduction in branch mispredictions due to having better quality predictions down the pipeline. A net benefit of the prediction run-ahead is the additional performance achieved by hitting faster BTB entries and optionally by prefetching them from a BTB victim cache.

What follows is a high-level description of branch target buffer operations. After that, improved branch buffer operation that includes a run-ahead predictor are described.

FIG. 1 illustrates, by way of example, a diagram of an embodiment of a system 100 for branch target prediction. The system 100, as illustrated, comprises components including a program counter 102, a branch history register 104, branch prediction structures 106, branch prediction circuitry 110, a branch prediction queue 112, a compute pipeline 114, data memory 116, program memory 118, a processor 120, and branch resolution circuitry 122.

The program counter 102 identifies an instruction in program memory 118 that is to be executed, such as by an address. The program counter 102 typically increments an instruction counter after providing a value of the instruction counter to prediction structures 106 and branch prediction circuitry 110. The program counter 102 thus typically defaults to a linear, increasing program count. Branch instructions are instructions that may provide a non-linearity to the sequence of instructions executed. Thus, the default operation of the program counter 102, in light of a branch instruction for which a branch is taken, needs to be overridden.

The branch history register (BHR) 104 includes data for a specified number of most recent conditional branches executed. The data for a given conditional branch can be a single bit. The bit can be set to "0" if the branch was not taken and "1" if the branch was taken. With each new conditional branch that is encountered in executing the application, the entries of the BHR 104 are shifted to the left and then the outcome of the new branch, as predicted by the branch prediction circuitry 110, is written into the rightmost position of the BHR 104. During the shifting, the bit in the leftmost position of the BHR 104 will be lost. For instance, with a 5-bit BHR and after 5 conditional branches since the start of the processor execution, the BHR 104 may contain the example sequence "10101", indicating that the last conditional branch seen in the program sequence was taken, the previous one was not taken, and so on. If a new conditional branch is seen and determined to be taken, the new BHR 104 contents would be 01011, resulting from the shift to the left of the previous value, losing the leftmost bit and adding a new bit on the right. The size of the BHR 104 is implementation dependent.

The branch prediction structures 106 include branch target buffers (BTBs) 124, 126, 128 that are typically indexed by a subset of the program counter values. For example, a number of least significant bits (LSBs) can be used to index into the BTBs 124, 126, 128. In another example, a same number of contiguous bits that are not the LSBs can be used to index into the BTBs 124, 126, 128. The BTBs 124, 126, 128 include entries that include branch destinations for branches that have historically corresponded to a branch. Thus, each BTB 124, 126, 128 includes a program counter value that has historically been executed immediately after the branch instruction that indexes into the entry.

There are multiple BTBs 124, 126, 128 illustrated in FIG. 1, however, a system may include only a single BTB 124, 126, 128. In systems that include multiple BTBs 124, 126, 128, one of the BTBs is typically stored physically in a memory that is relatively small and close to the prediction circuitry 110, another of the BTBs is stored a little further away or in a memory that is slower to access and has a larger capacity, and yet another of the BTBs is stored even further away or in a memory that is even slower to access and has an even larger capacity. The BTB closest to the prediction circuitry 110 is similar to an L1 cache for a processor in that it provides the fastest access times and has a smallest capacity among the BTBs. The other BTBs may be stored in a different location in the same package.

Other prediction structures 130 can include a direction buffer. The direction buffer can indicate whether the branch jumps to a program counter value less than the present program counter value or greater than the present program counter value. The prediction structures 130 can include data indicating a history of one or more program counter values that lead to the branch or were realized after the branch. Other prediction structures 130 can include a set of arrays accessed with different subsets of PC index and BHR 104. Entries in the other prediction structures 130 can be tagged and provide dynamic taken/not-taken predictions for conditional branches that change dynamically (a conditional branch predictor like a tagged geometric length predictor (TAGE)). The other prediction structures 130 can include dedicated structures that help find out which of the different targets of an indirect predictor is to be followed by a current PC and BHR 104 (indirect predictor, like an indirect target tagged geometric length predictor (ITTAGE)), a loop predictor, a return predictor, and so on.

Instead of waiting for the compute pipeline 114 to indicate a non-linearity to the program counter 102, prediction structures 106 and the branch prediction circuitry 110 can preemptively predict the non-linearity in the program counter 102. The branch prediction circuitry 110 can identify that a branch is likely to be taken and the program counter value associated with the branch. The branch prediction circuitry 110 can provide the program counter value to the program counter 102. The branch prediction circuitry 110 receives the program counter value, contents of the entry of the BTB 124, 126, 128, prediction structures 130, and branch history register 104, and indicator data from the branch prediction queue 112 that indicates whether the branch prediction queue 112 is full or not. The branch prediction circuitry 110 determines a likely next program counter value based on the received data. The branch prediction circuitry 110 can receive the totality of the BHR 104, such as to help determine the final outcome of the branch. The branch prediction circuitry 110 can use information from the BTBs 124, 126, 128, the BHR 104 and all other prediction structures 130 to make a prediction of the final outcome of the branch.

There are many types of branch prediction that can be implemented by the branch prediction circuitry 110. Example types of branch prediction include static techniques, dynamic techniques, history-based prediction, or a combination thereof. Example static techniques include using a heuristic like "assume branches are never taken" or "assume branches are always taken" and providing the program counter value accordingly.

In the case of dynamic branch prediction, the prediction circuitry 110 monitors the actual branch behavior by recording the recent history of each branch. Dynamic branch prediction assumes that the future behavior will continue the same way and make predictions. Examples of dynamic branch prediction techniques include using a 1-bit branch-prediction buffer, 2-bit branch-prediction buffer, a correlating branch prediction buffer, a tournament branch predictor, using an output from a BTB without further processing, a return address predictor, or a combination thereof. These predictors are known, but a short summary of each is provided, not including BTB because that has been explained already.

A 1-bit branch predictor stores 1-bit values to indicate whether the branch is predicted to be taken/not taken. The table can be indexed in the same manner as the BTB 124, 126, 128.

A 2-bit predictor changes prediction only on two successive mispredictions. Two bits are maintained in the prediction buffer and there are four different states. Two states corresponding to a taken state and two corresponding to not taken state. The 2-bit predictor schemes use only the recent behavior of a single branch to predict the future behavior of that branch.

In a correlating branch predictor behavior of one branch is dependent on the behavior of other branches. There is a correlation between different branches. Branch predictors that use the behavior of other branches to make a prediction are called correlating or two-level predictors. These predictors typically make use of global information rather than local behavior information. The information about any number of earlier branches can be maintained in the BHR 104. For example, the prediction circuitry 110 can maintain the information about three earlier branches so that the behavior of the current branch now depends on how these three earlier branches behaved.

A tournament predictor predicts the predictor and attempts to select the right predictor for the right branch. There are two or more different predictors maintained, typically one based on global information and one based on local information, and the choice of the predictor is based on a selection strategy. For example, the local predictor can be used and then every time it commits a mistake, the prediction can be changed to the global predictor. Alternatively, the switch between predictors can be made only when there are two or more successive mispredictions.

Note that in some BTB schemes, there is no 1-cycle penalty for a fastest BTB 124 in calculating the program counter value for a taken branch. A BTB scheme that uses the program counter value from the BTB 124 does not incur this penalty. The BTBs 126, 128 might need more time to provide a result and thus may still incur a penalty of one or more cycles.

Return address predictors predict indirect returns, that is, jumps whose destination address varies at run time. Indirect branches are a type of branch whose target may change when the same branch instruction is seen. Indirect branches can be divided in two classes: returns, and the rest. Both, returns and the rest, may have cases in which their target never changes, and in that situation, both are trivial to predict, and can be predicted by the BTB 124, 126, 128 without the intervention of additional prediction architecture. The situation in which indirect branches are hard to predict is when the target of the indirect branch changes target. Returns are predicted by the return stack buffer 334 and the rest of the hard indirect branches are predicted by an indirect predictor of the other prediction structures 130. Though procedure returns can be predicted with a BTB, the accuracy of such a prediction technique can be low if the procedure is called from multiple sites and the calls from one site are not clustered in time. To overcome this problem, return address predictors use a small buffer of return addresses operating as a stack in the return stack buffer 334. The return stack buffer 334 (see FIG. 3) caches the most recent return addresses: pushing a return address on the stack at a call and popping one off at a return. If the cache is as large as a maximum call depth it will predict the returns perfectly.

The program counter value from the branch prediction circuitry 110 is entered into the branch prediction queue 112 when the branch prediction queue 112 has sufficient space. The branch prediction queue 112 stores, in a first-in first-out (FIFO) manner, the branches predicted by the branch prediction circuitry 110. The branch prediction queue 112 provides the oldest program counter value it is storing to the compute pipeline 114.

The compute pipeline 114 is a series of stages that operate to provide the processor 120 with an instruction to execute and store results of the execution in the data memory 116. The compute pipeline 114 determines which instruction to fetch from the program memory 118 and provides the instruction, and corresponding data, to the processor 120. The processor 120 executes the instruction and the data memory 116 with the results.

The branch resolution circuitry 122 determines if the branch prediction circuitry 110 generated the same program counter value as the program counter value associated with the instruction that was executed by the processor 120 in executing the branch. The branch resolution circuitry 122 updates the branch history register 104 and the relevant prediction structures 106 if there is a mismatch between the program counter values. Also, if the prediction from the branch prediction circuitry 110 is not correct, the pipeline 114 can stall while re-fetching. There are processors 120 that are smart enough to prevent stalling while re-fetching, allowing instructions that are known correct because they were older than the mispredicted branch (in program order) to be executed while at the same time aborting the execution of instructions that were incorrectly fetched after the branch.

Each of the components of the system 100 is implemented using electric or electronic circuitry. The electric or electronic circuitry can include resistors, transistors, capacitors, inductors, diodes, amplifiers, logic gates (AND, OR, XOR, negate, buffer, or the like), multiplexers, switches, memory devices (e.g., random access memory (RAM) or read only memory (ROM)), processing units (e.g., a central processing unit (CPU), graphics processing unit (GPU), field programmable gate arrays (FPGAs), application specific integrated circuit (ASIC), or the like), power supplies, or the like.

For the branch prediction to be correct, the system 100 needs to correctly guess: whether the program counter value corresponds to a branch, whether the branch is to be taken, and if the branch is to be taken, what is the target program counter.

Figure 2:
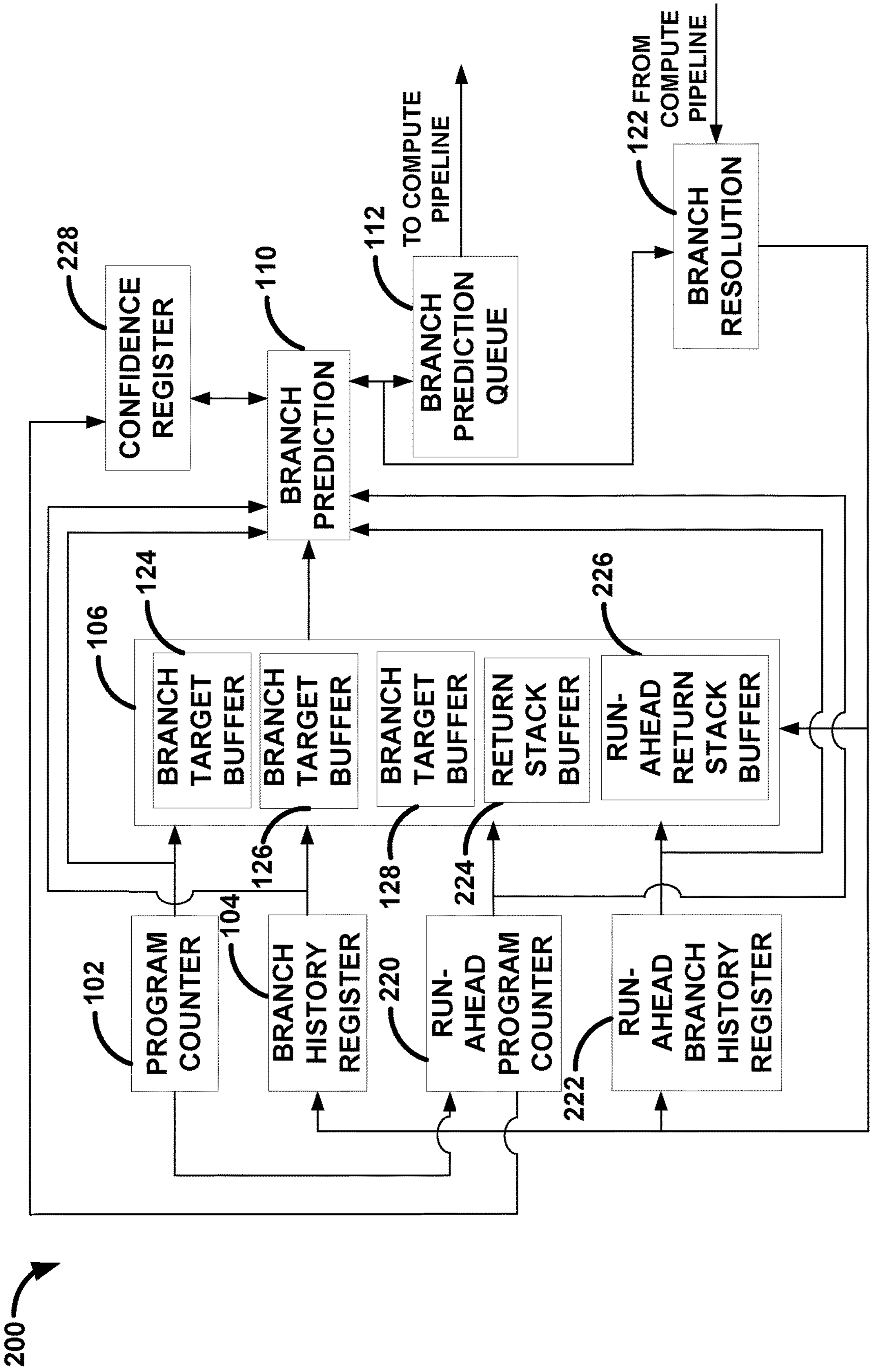
FIG. 2 illustrates, by way of example, a diagram of an embodiment of a BTB system that includes BTB run-ahead.

FIG. 2 illustrates, by way of example, a diagram of an embodiment of a BTB system 200 that includes BTB run-ahead. The system 200 as illustrated is similar to the system 100 with the system 200 including a second program counter (a run-ahead program counter 220), a second branch history register (a run-ahead branch history register 222), and two return stack buffers 224, 226. The return stack buffers 224, 226 are examples of the prediction structures 130. The run-ahead program counter 220, run-ahead branch history register 222, and the run-ahead return stack buffer 226 provide a second branch prediction pipeline. The second branch prediction pipeline, when it operates, operates independent of the BTB pipeline illustrated in FIG. 1. The first branch prediction pipeline is sometimes called a demand pipeline. The second branch prediction pipeline is sometimes called a run-ahead pipeline.

The run-ahead program counter 220 operates in the same manner as the program counter 102. The run-ahead program counter 220, however, can operate when the program counter 102 is stalled or otherwise not operating. The run-ahead program counter 102 generates a next program counter value based on a previous program counter value (generally an increment by an integer).

The run-ahead branch history register 222 is similar to the branch history register 104. The run-ahead branch history register 222 has at least the same entries as the branch history register 104 but may have data that is not in the branch history register 104. This is because the data generated in predicting future branch destinations may discover instructions that are branches. The run-ahead branch history register 222, if the predictions of the future branches are accurate, thus maintains a future state of the branch history register 104.

The return stack buffer 224 and the run-ahead return stack buffer 226 operate similarly. Each of the return stack buffers 224, 226 provide predictions for return instructions. Note that return instructions are branch instructions that jump to a top entry of a return stack buffer.

At any given time, two independent sequences of branch prediction can be happening, mostly in parallel, in the branch prediction pipeline. Mostly in parallel means that there can be completely parallel branch prediction sequences or there can be branch prediction sequences that have mostly independent resources but still share one or more resources. One of these branch prediction sequences, named the demand sequence, runs normally and writes entries in the BPQ 112, and that will be consumed by the compute pipeline 114. Another of these branch prediction sequences, named the run-ahead sequence, runs ahead of the demand sequence in terms of the program counter value. The run-ahead sequence anticipates lower-level BTB (BTBs with relatively lower access times among the BTBs) misses and potentially prefetches entries from a BTB victim cache 420 (see FIG. 4). The run-ahead prediction pipeline does not write any entries in the BPQ 112, though.

The two sequences both detect instruction branches and their targets, and follow the targets of the branches in advance of providing instructions. However, the sequences operate on different program counter values. The demand sequence operates in concert with the compute pipeline 114 to provide a program counter value corresponding to a next instruction. The run-ahead sequence operates to predict program counter values, by program counter 220, and branch targets that are likely to be seen after the next instruction.

After reset of the system 200, and after every "synchronization event", the two program counters 102, 220 can be set to the same state and thus provide the same program counter value. Reset can be caused by a power cycle of the device, a compute pipeline 114 stall that can be caused by a branch misprediction, a software reset, or the like.

Then, when execution starts again after the reset or synchronization event, the program counter 102, branch history register 104, and other components dedicated to the demand sequence can operate while the run-ahead sequence remains idle. Running both sequences simultaneously in such circumstances would be a waste of energy and resources. In some instances, the run-ahead program counter 220 and the run-ahead branch history register 222 are updated to states of the program counter 102 and the branch history register 104 as the demand sequence operates.

Whenever the demand sequence stalls, for instance because the BPQ 112 gets full, the run-ahead sequence will start running on its own. In some instances, the demand sequence and the run-ahead sequence only operate when the other is not operating. This is called "opportunistic" because the run-ahead sequence will only operate when the demand sequence stalls and otherwise does not operate. When there is another stall event, the run-ahead program counter 220 is loaded with the program counter value from the program counter 102 and continues operating from there. In some instances, the demand sequence and the run-ahead sequence operate completely in parallel and the stall event is a trigger for the run-ahead sequence to begin operating. The run-ahead sequence then operates until a synchronization event occurs, a confidence of the prediction in the run-ahead sequence is below a threshold value, or the like.

The synchronization event is implementation dependent, but it is basically any event that redirects the demand sequence, typically a branch misprediction or a pipeline flush, but many circumstances are possible.

When the demand and run-ahead sequences run in parallel, they can share some resources and can include some resources that are dedicated. Resources that are dedicated can be replicated, but operate based on different entries or program counter values. For instance, the "read ports" of the BTBs 124, 126, 128, or the tables in the prediction support structures 130, may be replicated, banked, or shared. If they are replicated, the demand and run-ahead sequences can run totally independently, whereas if one or more of the structure ports are shared, then a policy can be beneficial to distribute the resources among the demand and run-ahead sequences.

For example, a policy can be set such that the demand sequence always has priority and the run-ahead sequence advances only when the demand sequence does not have a pending request for access. If there are no conflicts in the access to shared resources, both can advance simultaneously, but if there is any conflict, the demand sequence will advance while that run-ahead sequence will pause until the collision clears up, either because both sequences now access different banks and can proceed together, or because the demand sequence is stalled.

A shared structure can be partitioned into banks. When the entry needed by the demand pipeline and the entry needed by the run-ahead pipeline are in different banks, both can run in parallel without any collision. However, when both entries happen to be in the same bank, then only one can proceed, typically the demand pipeline, and the run-ahead waits for another opportunity. Banking provides a good fraction of the benefits of replicated ports with less implementation cost. Also, structures are typically banked by other implementation reasons, so banks are available to be used in this manner with minimal cost, usually just wiring.

A structure used to track the state of the branch prediction circuitry 110 can be replicated. An example of such a structure is the return stack buffer (RSB) 224 and the branch history register (BHR) 104. In some instances, components or structures that alter their output based on a state can be replicated such that there is an individual instance of each of them in the demand sequence and the run-ahead sequence. The state is updated with every step of each of the sequences, so if both sequences are operating based on different program counter values, each must track such state separately to avoid destructive interference. Another approach can be to convert the structure, such as the RSB 224, into a double-linked list. Using the double-linked list can remove the need to have independent instances in each of the demand and run-ahead sequences.

The RSB 226 can be implemented as a lightweight version of the RSB 224, such as to help minimize the cost of replicating the RSB 224 as the RBS 226. A lightweight version can, instead of a typical storing full PC addresses when a call instruction is observed (and recalling such PC when a return instruction is observed), store a reduced amount of information as compare to the RSB 224. The RSB 226 can store a current BTB entry index and offset, which will typically require much less storage. This reduced RSB 226 can also be sized with less entries than the demand RSB 224. When the maximum capacity of the reduced RSB 226 is reached, the run-ahead sequence can stall.

To avoid having the run-ahead sequence running too far, using additional energy, and potentially going beyond a branch misprediction, and potentially populating the smaller BTB levels with useless entries, a "confidence" value can be maintained. The confidence value indicates how likely it is that the predicted branch is correct. For every branch prediction beyond the most immediate next branch prediction, the confidence can be maintained or decreased (e.g., but cannot increase). The amount of change to the confidence can be based on the individual confidence for each branch prediction. When the confidence value falls below (e.g., a dynamically configurable) threshold, the run-ahead sequence can stall and wait for the demand sequence to get closer. This can be computed using one counter of predictions for every sequence, the difference between two indicates how many branches ahead is the run-ahead sequence. When the distance reaches a dynamically configurable threshold, the run-ahead sequence will resume, resetting the confidence value, which is also reset on a resynchronization event. The reset value for the confidence is dynamically configurable with a control register 228. Note that a little bit of speculation is positive and will prefetch entries for a code path that will likely be followed in the near future.

Figure 3:
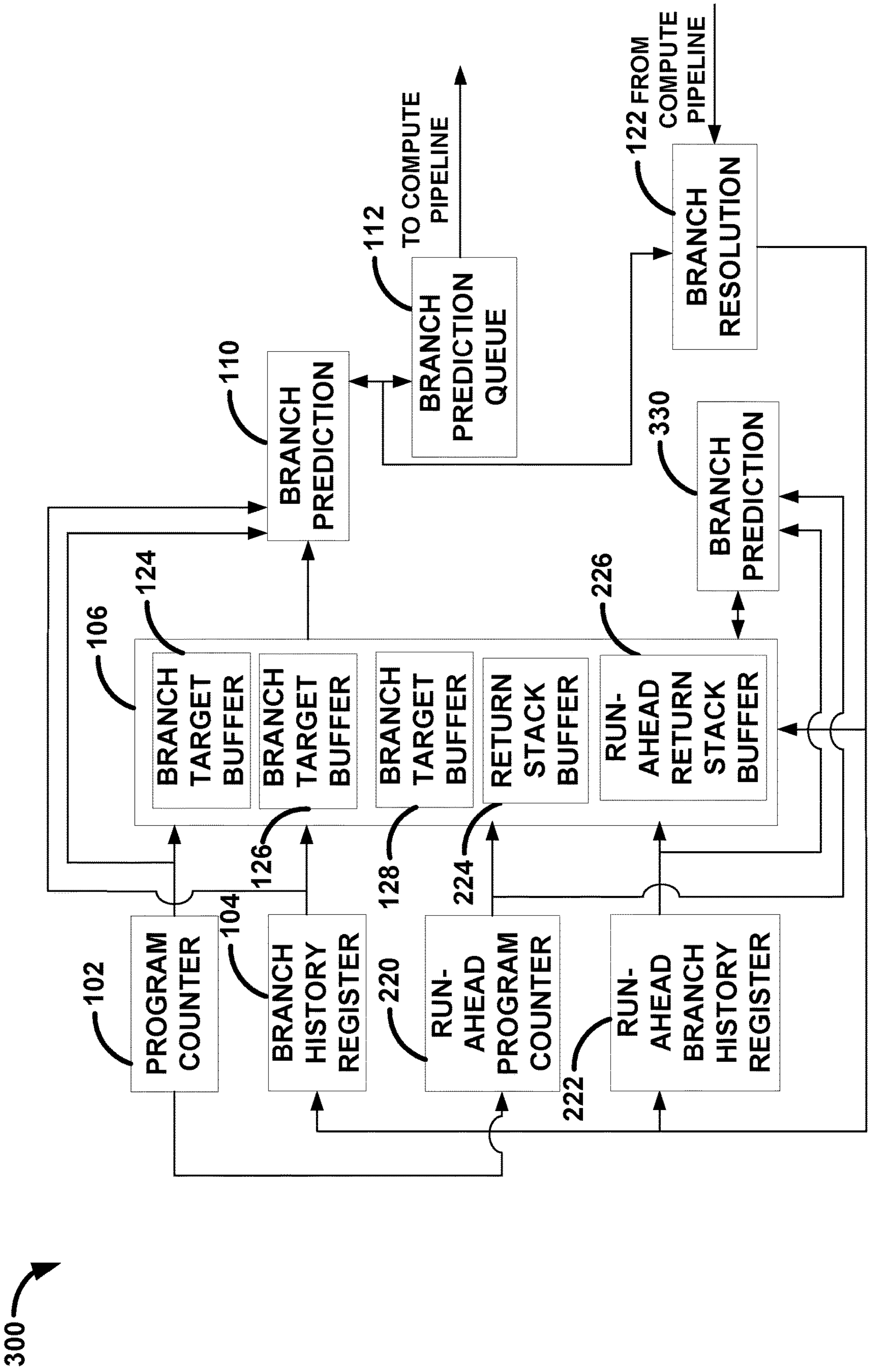
FIG. 3 illustrates, by way of example, a diagram of an embodiment of a BTB system that includes redundant prediction circuitry.

FIG. 3 illustrates, by way of example, a diagram of an embodiment of a BTB system 300 that includes redundant prediction circuitry 330. The system 300 is similar to the system 200 with the system 300 including both of branch prediction circuitry 110 dedicated to predicting branches for the demand sequence and branch prediction circuitry 330 dedicated for predicting branches for the run-ahead sequence. The branch prediction circuitry 330 can be a physical replica of the branch prediction circuitry 110. However, the branch prediction circuitry 330 is operating based on a different program counter value (the value from the program counter 220) than that of the branch prediction circuitry 110 (the value from the program counter 102) and is thus in a different state. Further, the branch prediction circuitry 330 is not coupled to the branch prediction queue 112, branch resolution circuitry 122, or a combination thereof.

The demand sequence operates using the program counter 102, BHR 104, BTBs 124, 126, 128, RSB 224, branch prediction circuitry 110, branch prediction queue 112, and the components coupled downstream therefrom. The run-ahead sequence operates using the run-ahead program counter 220, the run-ahead BHR 222, the BTBs 124, 126, 128, run-ahead RSB 226, and the branch prediction circuitry 330. The branch prediction circuitry 330 can be communicatively decoupled from the compute pipeline 114 and can only influence the compute pipeline 114 through changes to the BTBs 124, 126, 128.

Figure 4:
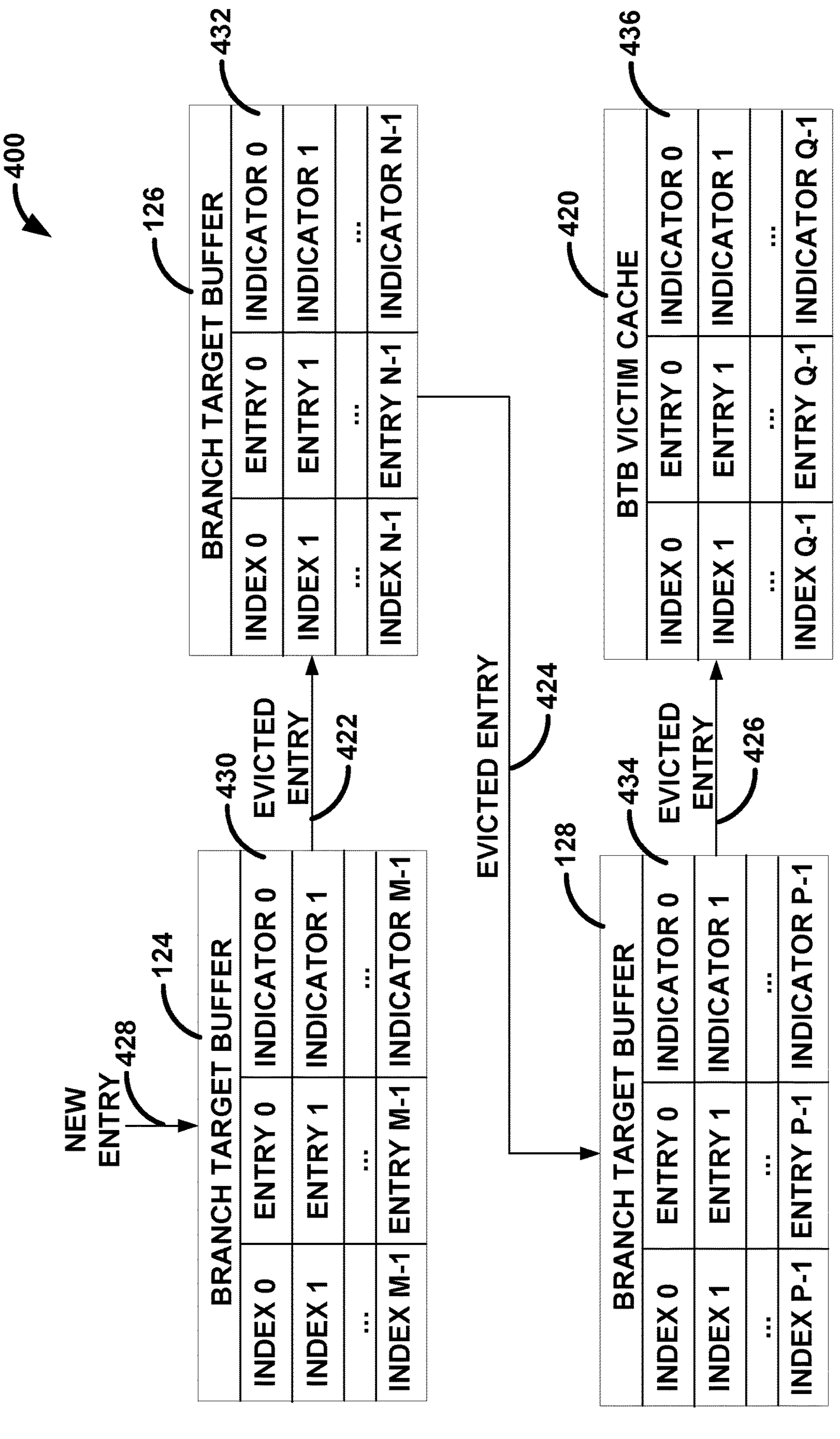
FIG. 4 illustrates, by way of example, a flow diagram of an embodiment of evicted entries in systems that include a BTB victim cache.

FIG. 4 illustrates, by way of example, a flow diagram of an embodiment of evicted entries in systems that include a BTB victim cache 420. FIG. 4 describes a particular allocation/eviction policy for the set of BTBs 124, 126, 128, but many other policies exist. For instance, the processor 120 may always allocate new entries in the last level BTB 128 only. The entry is then promoted to an earlier level or levels when it is used. Further, evicted entries at different BTB 124, 126, 128 levels may be evicted directly without attempting an allocation at other levels, so it is not mandatory for an evicted entry to be sent to the next level, it is dependent on the implementation.

The example of FIG. 4 includes a hierarchy of three BTBs 124, 126, 128 and more or fewer BTBs can be used. A new entry 428 is written to the closest BTB 124. The new entry 428 can be prompted from the branch resolution circuitry 122. The branch resolution circuitry 122 can detect when an instruction corresponds to a branch and the next point counter value that was executed after the branch. The branch resolution circuitry 122 can update the BTB 124 to alter an entry or provide an entirely new entry. Because the BTB 124 is has fewer entries than required to execute the application(s) being executed using the program memory 118, the BTB 124 can run out of room for additional entries. The new entry 428 can thus cause an instruction to be evicted from the BTB 124. Evicted entry 422 is an example of such an entry.

The evicted entry 422 can be stored in a next BTB, which is the BTB 126 in the example of FIG. 2. The BTB 126 is typically larger and slower to access than the BTB 124. That is N>M in most instances. The BTB 126 may also be full and entry of the evicted entry 422 can cause another entry to be evicted. An evicted entry 424 is an example of such an entry.

The evicted entry 424 can be stored in a next BTB, which is the BTB 128 in the example of FIG. 4. The BTB 128 is typically larger and slower to access than the BTB 126. That is P>N in most instances. The BTB 128 may also be full and entry of the evicted entry 424 can cause another entry to be evicted. An evicted entry 426 is an example of such an entry.

In the example of FIG. 4, an entry evicted from the last BTB 128 in the hierarchy can be stored in the BTB victim cache 420. In other examples, BTB entries evicted from any of the BTBs 124, 126, 128 can be allocated to the victim cache 420. BTB 128 is the slowest BTB in the hierarchy. The victim cache 420 is typically larger and slower to access than the BTB 128. That is Q>P in most instances.

The system 100 can know to check the victim cache 420 for an entry based on indicator data 430, 432, 434. The indicator data 430, 432, 434 can be associated with each entry in the BTB caches 124, 126, 128. The indicator data 430, 432, 434 details whether an entry has previously been evicted therefrom. If a branch lookup in the BTBs 124, 126, 128 are each unsuccessful and the indicator data 430, 432, 434 details that an entry was previously evicted therefrom, a lookup operation can be performed on the BTB victim cache 420. Note that lookup to the BTBs 124, 126, 128 typically happens in parallel, so latency is only as long as the slowest BTB lookup, which typically corresponds to the BTB 128.

The indicator data 430 of one entry does not refer to the entry itself, but the entry that follows it. For instance, if a BTB entry identifies a branch X and specifies that the target of the branch is Y, then the indicator data 430 refers to an entry in the BTBs 124, 126, 128 for address Y. When Y is not found, but the previous prediction via X indicated that there was an entry for it, then it is known that a BTB entry for Y existed. The victim cache 420 can be accessed to look for the entry corresponding to Y in such circumstances.

Note the victim cache 420 includes an indicator data 436, such as to keep the structure of the data in the victim cache 420 consistent, such as for decoding and re-allocation purposes. If one entry from the victim cache 420 is later re-written into one of the BTBs 124, 126, 128, the indicator data 436, which indicates whether the continuation of the BTB entry is expected to exist or not will be entered as well. This way, the indicator data 430 chaining another existing BTB entry is only lost definitely when an entry in the victim cache 420 is evicted.

Figure 5:
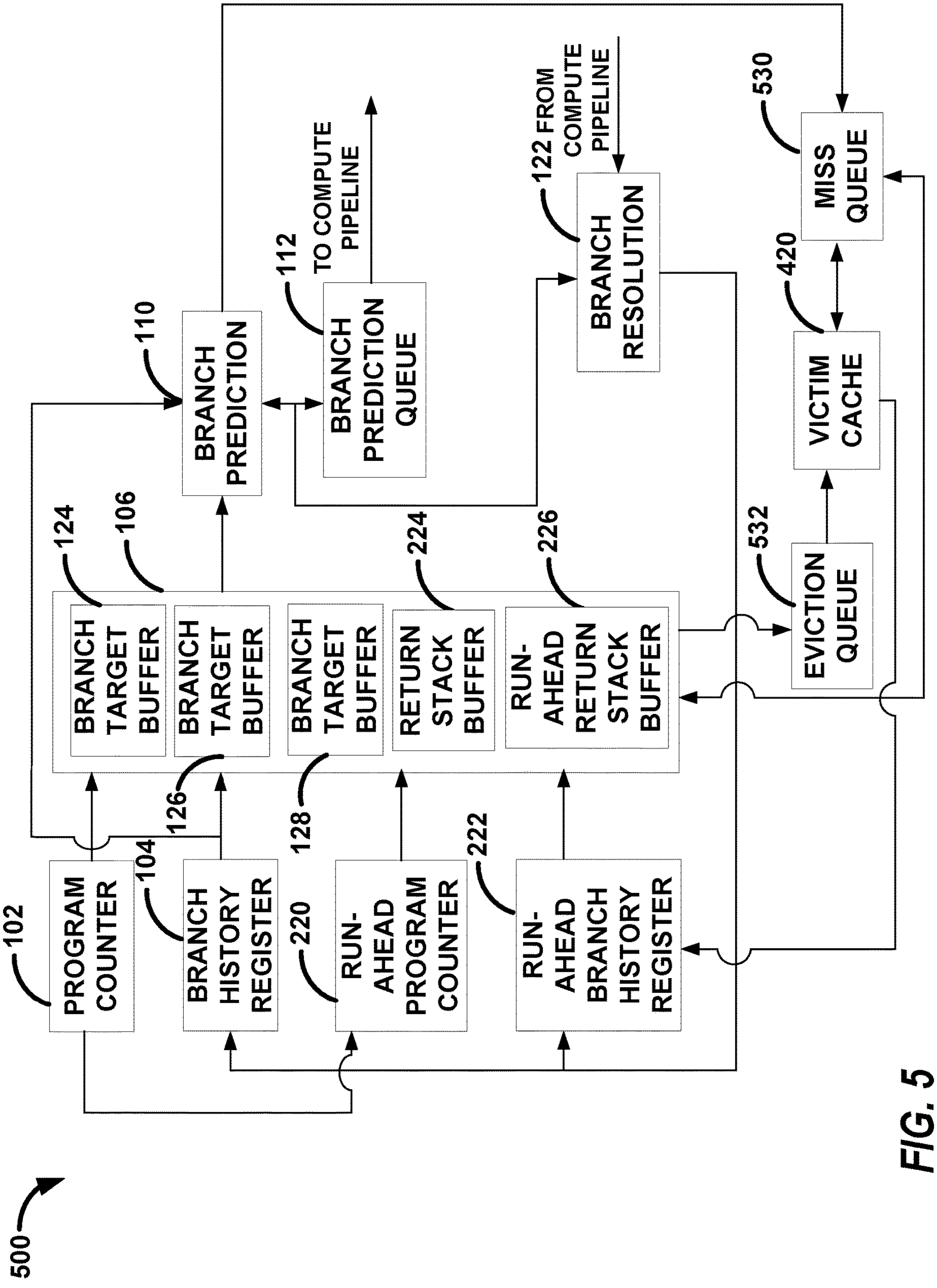
FIG. 5 illustrates, by way of example, a diagram of an embodiment of a BTB system that includes a victim cache.

FIG. 5 illustrates, by way of example, a diagram of an embodiment of a BTB system 500 that includes a victim cache 420. The system 500 is similar to the system 100, with the system 500 including the victim cache 420, miss queue circuitry 530, eviction queue circuitry 532, and a return stack buffer 534. The miss queue circuitry 530 and eviction queue circuitry 532 manage the contents of the victim cache 420.

Entries in the prediction structures 106 are typically small fractions of information associated with blocks of memory in a given address space (whether virtual or not). The BTB entries hold information about instruction branches present in those blocks, like the position of the branches, branch type, the branch address target (e.g., virtual address target), a combination thereof, or the like. A BTB entry can be deemed to not exist when no branches are present in a corresponding virtual address block, or conditional branches exist but they never follow the taken path. This is also true for regions of code that have branches but have not yet been discovered. BTB entries are created when branches are first discovered, the contents of the entries are populated with details from those branches and the entries are written in one or more BTBs. When one entry from a BTB 124, 126, 128 is evicted, the evicted entry is allocated into an eviction queue of the eviction queue circuitry 532, which can hold several entries.

A finite state machine (FSM) or other logic-based structure, part of the eviction queue circuitry 532, can opportunistically pick entries from the eviction queue circuitry 532. The FSM includes circuitry that can be in exactly one of a finite number of states at any given time. The FSM can change from one state to another in response to a change in input. Output of the FSM can change based on the state. The logic-based structure initiates the process of writing the evicted entry to the victim cache 420.

The evicted entry can already be present in the victim cache 420. The eviction queue circuitry 532 can perform a lookup operation before allocation. If the evicted entry is already present at the index, it can be replaced with the contents of the BTB, which is possibly holding more recent information about the branch. Otherwise, a new entry will be allocated, possibly erasing another entry, which will be discarded. There is no need to have control flow for the eviction queue, since writes to the victim cache 420 can be dropped without impacting functionality.

On a lookup that is missing in all the BTBs 124, 126, 128, a load operation for the victim cache 420 will be started. Since BTB entries do not exist for some addresses, a method can distinguish between a BTB entry that is missing from a BTB entry that does not exist. This can be accomplished by annotating direct links between BTB entries. The indicator data 430, 432, 434 can provide a link that indicates the existence of a BTB entry. A fetch from the victim cache 420 can be issued if an indication of previous existence has been seen in the previous BTB entry that redirected to this one. If no presence has been seen in the past, this lookup can be saved to the BTBs 124, 126, 128.

When one existing BTB entry is followed by another existing BTB entry, either by a taken or a not-taken branch, the first entry can be annotated to indicate that the next BTB entry exists, using the indicator data 430, 432, 434. Since one existing BTB entry may be followed by several, valid existing BTB entries, depending on the path followed as instructed by the branch prediction circuitry 110, several annotations regarding the existence of such BTB entries can be used in the indicator data 430, 432, 434. Each annotation can be implemented with a single bit (exists/does not exist). For conditional branches, that can follow taken and not-taken paths, it is feasible to have one bit for each of the two paths. Then the prediction circuitry 110 can indicate if the branch is predicted taken or non-taken, and the corresponding bit can be used for the next BTB 124, 126, 128 access. For "easy" indirect branches, which are those that always follow the same path, a single bit is sufficient, and this covers a good fraction of the number of such branches. However, there are indirect branches whose target changes each time they are visited, and this target is usually determined by the value at the BHR at each visit. This multi-target situation is resolved by the indirect predictor, which is part of the other prediction structures 130. For this situation, it is trivial to have the indicator bit in the indirect predictor, together with the target. That way, different targets will have their own bit indicating whether the continuation has been observed previously or not, and the continuation bit from the indirect predictor will override the bit in the BTB entry. Note that these "difficult" indirect branches are identified because this is usually annotated in the BTB 124, 126, 128, indicating that the ultimate resolution for this branch must come from the indirect predictor. The same can be done with returns, that are a subcase of indirect branches, but handled by the return stack buffer 534, and the indicator data 430 can be saved together with the target in the return stack buffer 534.

The return stack buffer 534 provides predictions for return instructions. Note that return instructions are branch instructions that jump to a top entry of a return stack buffer 534.

When an existing BTB entry, in one of the BTBs 124, 126, 128 is not followed by another existing BTB entry, it can be assumed that the continuation of the code has not yet been observed or that the entry indicating its existence has been dropped, and no attempt to find such entry will be performed, saving the energy and the latency of an operation that is known to be unfruitful.

When a previously existing BTB entry misses in all the BTBs 124, 126, 128, a load operation can be requested, by the branch prediction circuitry 110 and from the miss queue circuitry 530. The load operation can cause the miss queue circuitry 530 to return the entry (if there is one) from the victim cache 420. A miss queue, of the miss queue circuitry 530, can hold several entries waiting to be serviced. Although only one miss will be active at a given time.

The branch prediction circuitry 110 can be paused after it issues its request to the miss queue circuitry 530, since it cannot continue operating without the information contained in the missing BTB entry. This saves the energy of following a path that has been found to be incorrect in the past, since the existence of a BTB entry indicates that branches are present.

Optionally, a BTB miss indication can be sent to the pipeline 114 to the instruction fetch engine. This optimization of the algorithms tries to minimize the performance impact of waiting for the BTB victim cache 420 by starting to decode the instructions and finding the branches again. The following steps describe this optimization.

At that moment, a race between two sequences of operations starts: (i) a first sequence of operations is the lookup in the BTB victim cache 420, which is picked up opportunistically from the miss queue circuitry 530. Since earlier misses may have been annotated as discarded because of a redirection, the first operation does not need to hold the first position of the queue. The address (e.g., virtual address) can be used to look up the entry of the miss in the BTB victim cache 420.

If an entry corresponding to the address is found in the BTB victim cache 420, the contents of the entry can be sent back to the branch prediction circuitry 110. A refill into one or more BTBs 124, 126, 128 can be performed, such as by the branch prediction circuitry 110 or the miss queue circuitry 530. Operations of the branch prediction circuitry 110 can resume.

The BTB miss indication can reach the decode stage of the compute pipeline 114 before the victim cache 420 responds to the request from the miss queue circuitry 530. This is likely in the presence of the branch prediction queue 112, which detaches prediction and fetch pipelines, allowing the branch prediction to run ahead of the instruction fetch. When that happens, the BTB miss indication can be amended by the prediction circuitry 110 when victim cache 420 refill happens with the missed branch information that was missing during the initial prediction moment, and normal operations can resume, without impacting performance of the instruction stream. This is the optimal situation targeted by this invention.

If no entry corresponding to the address is found in the victim cache 420, a "miss" response is provided by the miss queue circuitry 530. The branch prediction circuitry 110 can remain paused until the decode engine of the compute pipeline 114 determines the next branch to be taken. In this instance the victim cache 420 will not benefit the system 500.

(ii) The second sequence of operations in the race happens in the fetch and execution parts of the pipeline 114. During the decode stage of the pipeline 114, the type of branch that the branch prediction circuitry 110 could not find will be determined. Several outcomes are possible, which may or may not win the race against the BTB victim cache 420: (i) A direct unconditional branch can be resolved by the decoder of the compute pipeline 114, by resolving the target address of the branch and redirecting the processor 120. This includes direct calls. (ii) A direct conditional branch can be resolved to either taken or not taken, following a static prediction approach or a different one, and redirecting or un-pausing the branch prediction circuitry 110. (iii) An indirect branch does not know which path to follow, so the processor 120 can be paused at the indirect branch itself to save energy and wait for the resolution of the target by the victim cache 420, or a miss, and then proceed with or without a target, respectively. This includes indirect calls and return instructions. The response from the victim cache 420 can then be used to resume the pipeline. An optimization can include sending the indirect branch through the pipeline 114 for execution and resolution without waiting for the response from the victim cache 420. After the target of the branch is resolved by the instructions leading to the missing branch, the processor 120 can be redirected and restarted (if it was paused). Another possible optimization is to avoid some operations of the compute pipeline 114 when the response from the victim cache 420 arrives before the branch resolution and matches its outcome. In that case, the processor 120 can resume with the response, which will then be validated by the resolution of the indirect branch.

Resolution of the target of the branch by the response from the victim cache 420 before resolution by the compute pipeline 114, reducing latency and energy, provides energy savings obtained by not completely executing code responsive to an indirect branch with an unknown target. When the response from the victim cache 420 is later than the resolution by the compute pipeline 114, either by dropping the request or because the decode is resolved first, a corresponding request in the miss queue 530 can be annotated so that the response is dropped upon reception. A bit can indicate whether the entry is still relevant or not.

Improved branch buffer operation is applicable to a wide variety of BTB hierarchy levels and allocation and evicting policies. Improved branch buffer operation are not limited to a set or subset of allocation and eviction policies.

Improved branch buffer operation can include a simple approach that pauses the indirect branch itself and the instructions after it, and then proceeds processing of the indirect branch when the victim cache 420 is resolved. The victim cache 420 can either have a target or report a miss when there is no target in the victim cache 420. Either way, the processing of the indirect branch can proceed in either case and the compute pipeline 114 can resolve the actual target of the indirect branch.

Improved branch buffer operation can alternatively include a more complex approach that pauses the instructions after the indirect branch, but does not pause the further processing of the indirect branch itself. The indirect branch can be sent to the compute pipeline 114 to start resolving the target while the victim cache 420 is accessed to potentially provide the predicted target. A benefit of this approach is that the resolution from the compute pipeline 114 operates in parallel with the victim cache 420 operation. These more complex improved branch buffer operation can save time and potentially resolve earlier than the simpler improved branch buffer operation. A difficulty in the more complex approach is that the indirect branch needs to be "intercepted" and stopped with a hit from the victim cache 420. The indirect branch is somewhere in the compute pipeline 114, to provide the target obtained from the victim cache 420, making it available for a comparison against the branch target determined by the compute pipeline 114.

FIG. 6 illustrates, by way of example, a diagram of an embodiment of a method 600 for branch target prediction run-ahead. The method 600 as illustrated includes storing, by a hierarchy of branch target buffers entries corresponding to branch instructions, the hierarchy of branch target buffers including respective branch target buffers that have progressively slower access times, at operation 660; generating, by a first program counter, a first program counter value associated with a next instruction of an executing application, at operation 662; generating, by a second program counter, a second program counter value that is associated with a subsequent instruction of the executing application that is after the next instruction, at operation 664; and moving, by branch prediction circuitry, an entry of a branch target buffer of the branch target buffers to another branch target buffer of the branch target buffers based on the second program counter value, at operation 666.

The method 600 can further include populating, by the branch prediction circuitry, a branch target buffer of the respective branch target buffers with a faster access time with an entry corresponding to the second program counter value and from a branch target buffer of the branch target buffers with a slower access time. The method 600 can further include storing, by a first branch history register, branch target data associated with most recent branch instructions of the executing application in accord with the first program counter. The method 600 can further include storing, by a second branch history register, branch target data associated with most recent branch instructions of the executing application in accord with the second program counter.

The method 600 can further include populating a first return stack buffer in accord with the first program counter value. The method 600 can further include populating a second return stack buffer in accord with the second program counter value. The second return stack buffer can store less data than the first return stack buffer.

Figure 7:
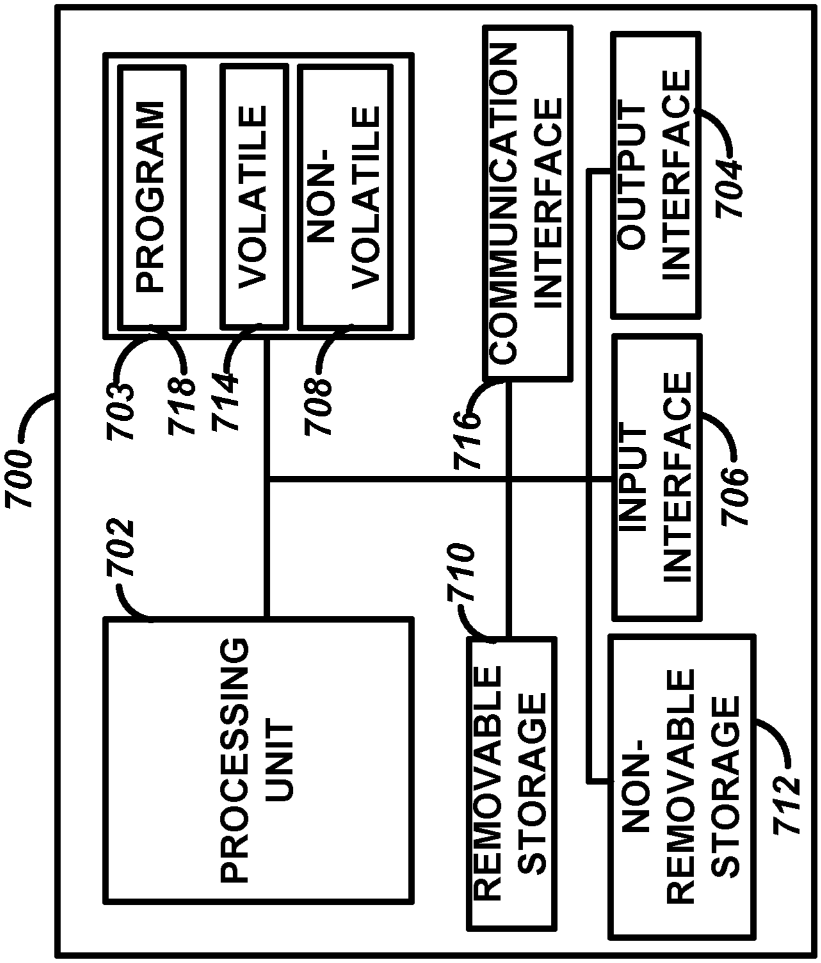
FIG. 7 is a block schematic diagram of a computer system that can include a BTB victim cache, BTB run-ahead, a combination thereof, and for performing methods and algorithms according to example embodiments.

FIG. 7 is a block schematic diagram of a computer system 700 that can include a BTB victim cache, BTB run-ahead, a combination thereof, and for performing methods and algorithms according to example embodiments. Any of the components of the system 100, 200, 300, 500, victim cache 420, method 600, or other component or operation can be implemented using the system 700 or a component thereof. All components of the system 700 need not be used in various embodiments.

One example computing device in the form of a computer 700 may include a processing unit 702, memory 703, removable storage 710, and non-removable storage 712. Although the example computing device is illustrated and described as computer 700, the computing device may be in different forms in different embodiments. For example, the computing device may instead be a smartphone, a tablet, smartwatch, smart storage device (SSD), or other computing device including the same or similar elements as illustrated and described with regard to FIG. 7. Devices, such as smartphones, tablets, and smartwatches, are generally collectively referred to as mobile devices or user equipment.

Although the various data storage elements are illustrated as part of the computer 700, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 703 may include volatile memory 714 and non-volatile memory 708. Computer 700 may include—or have access to a computing environment that includes—a variety of computer-readable media, such as volatile memory 714 and non-volatile memory 708, removable storage 710 and non-removable storage 712. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 700 may include or have access to a computing environment that includes input interface 706, output interface 704, and a communication interface 716. Output interface 704 may include a display device, such as a touchscreen, that also may serve as an input device. The input interface 706 may include one or more of a touchscreen, touchpad, mouse, keyboard, camera, one or more device-specific buttons, one or more sensors integrated within or coupled via wired or wireless data connections to the computer 700, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 700 are connected with a system bus 720.

Computer-readable instructions stored on a computer-readable medium are executable by the processing unit 702 of the computer 700, such as a program 718. The program 718 in some embodiments comprises software to implement one or more methods described herein. A hard drive, CD-ROM, and RAM are some examples of articles including a non-transitory computer-readable medium such as a storage device. The terms computer-readable medium, machine readable medium, and storage device do not include carrier waves or signals to the extent carrier waves and signals are deemed too transitory. Storage can also include networked storage, such as a storage area network (SAN). Computer program 718 along with the workspace manager 722 may be used to cause processing unit 702 to perform one or more methods or algorithms described herein.

ADDITIONAL NOTES AND EXAMPLES

Example 1 includes a device comprising a hierarchy of branch target buffers storing entries corresponding to branch instructions, the hierarchy of branch target buffers including respective branch target buffers that have progressively slower access times, a first program counter configured to generate a first program counter value associated with a next instruction of an executing application, a second program counter configured to predict a second program counter value that is associated with a subsequent instruction of the executing application that is after the next instruction, and first branch prediction circuitry configured to populate a branch target buffer of the branch target buffers based on the second program counter value.

In Example 2, Example 1 further includes, wherein the first branch prediction circuitry is configured to populate a branch target buffer of the respective branch target buffers with a faster access time with an entry corresponding to the second program counter value and from a branch target buffer of the branch target buffers with a slower access time.

In Example 3, at least one of Examples 1-2 further includes a first branch history register that stores branch data associated with most recent branch instructions of the executing application in accord with the first program counter, and a second branch history register that stores branch data associated with most recent branch instructions of the executing application in accord with the second program counter.

In Example 4, at least one of Examples 1-3 further includes a first return stack buffer populated in accord with the first program counter value, and a second return stack buffer populated in accord with the second program counter value.

In Example 5, Example 4 further includes, wherein the second return stack buffer stores less data than the first return stack buffer.

In Example 6, at least one of Examples 1-5 further includes, wherein the first branch prediction circuitry operates based on the second program counter value when a compute pipeline that operates based on the first program counter value is stalled.

In Example 7, at least one of Examples 1-6 further includes second branch prediction circuitry that operates based on the second program counter value.

In Example 8, Example 7 further includes, wherein the second branch prediction circuitry predicts only a specified number of instructions past the next instruction.

In Example 9, at least one of Examples 7-8 further includes, wherein the first and second branch prediction circuitry are configured to operate concurrently and the second branch prediction circuitry promotes an entry from a branch target buffer of the branch target buffers that has a slower access time to a branch target buffer of the branch target buffers that has a faster access time and does not have the entry.

In Example 10, at least one of Examples 1-9 further includes, wherein the first branch prediction circuitry is configured to set the second program counter to the first program counter value when a compute pipeline that operates based on the first program counter value is stalled.

In Example 11, at least one of Examples 1-10 further includes a victim cache configured to receive an entry that has been evicted from a branch target buffer of the branch target buffers, and wherein the first branch prediction circuitry is configured to access the victim cache responsive to receiving respective miss indications from each branch target buffer of the branch target buffers based on the second program counter value.

In Example 12, Example 11 further includes, wherein the first branch prediction circuitry is configured to populate a branch target buffer of the branch target buffers with an entry associated with the second program counter value from the victim cache.

Example 13 includes a method comprising storing, by a hierarchy of branch target buffers entries corresponding to branch instructions, the hierarchy of branch target buffers including respective branch target buffers that have progressively slower access times, generating, by a first program counter, a first program counter value associated with a next instruction of an executing application, generating, by a second program counter, a second program counter value that is associated with a subsequent instruction of the executing application that is after the next instruction, and moving, by branch prediction circuitry, an entry of a branch target buffer of the branch target buffers to another branch target buffer of the branch target buffers based on the second program counter value.

In Example 14, Example 13 further includes populating, by the branch prediction circuitry, a branch target buffer of the respective branch target buffers with a faster access time with an entry corresponding to the second program counter value and from a branch target buffer of the branch target buffers with a slower access time.

In Example 15, at least one of Examples 13-14 further includes storing, by a first branch history register, branch target data associated with most recent branch instructions of the executing application in accord with the first program counter, and storing, by a second branch history register, branch target data associated with most recent branch instructions of the executing application in accord with the second program counter.

In Example 16, at least one of Examples 13-15 further includes populating a first return stack buffer in accord with the first program counter value, and populating a second return stack buffer in accord with the second program counter value.

In Example 17, Example 16 further includes, wherein the second return stack buffer stores less data than the first return stack buffer.

Example 18 includes a hierarchy of branch target buffers storing entries corresponding to branch instructions, the hierarchy of branch target buffers including respective branch target buffers that have progressively slower access times, a first program counter configured to generate a first program counter value associated with a next instruction of an executing application, a second program counter configured to predict a second program counter value that is associated with a subsequent instruction of the executing application and is after the next instruction, and first branch prediction circuitry configured to populate a branch target buffer of the respective branch target buffers with a faster access time with an entry corresponding to the second program counter value and from a branch target buffer of the branch target buffers with a slower access time.

In Example 19, Example 18 further includes a first branch history register that stores branch data associated with most recent branch instructions of the executing application in accord with the first program counter, and a second branch history register that stores branch data associated with most recent branch instructions of the executing application in accord with the second program counter.

In Example 20, at least one of Examples 18-19 further includes, wherein the branch prediction circuitry operates based on the second program counter value when a compute pipeline that operates based on the first program counter value is stalled.

In Example 21, at least one of Examples 18-20 further includes second branch prediction circuitry that operates based on the second program counter value.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A device comprising:

a hierarchy of branch target buffers storing entries corresponding to branch instructions, the hierarchy of branch target buffers including respective branch target buffers that have progressively slower access times;

a first program counter configured to generate a first program counter value associated with a next instruction of an executing application;

a second program counter configured to predict a second program counter value that is associated with a subsequent instruction of the executing application that is after the next instruction; and first branch prediction circuitry configured to:

populate a branch target buffer of the branch target buffers based on the second program counter value; and set the second program counter to the first program counter value when a compute pipeline that operates based on the first program counter value is stalled.

2. The device of claim 1, wherein the first branch prediction circuitry is configured to populate a branch target buffer of the respective branch target buffers with a faster access time with an entry corresponding to the second program counter value and from a branch target buffer of the branch target buffers with a slower access time.

3. The device of claim 1, further comprising:

a first branch history register that stores branch data associated with most recent branch instructions of the executing application in accord with the first program counter; and a second branch history register that stores branch data associated with most recent branch instructions of the executing application in accord with the second program counter.

4. The device of claim 1, further comprising:

a first return stack buffer populated in accord with the first program counter value; and a second return stack buffer populated in accord with the second program counter value.

5. The device of claim 4, wherein the second return stack buffer stores less data than the first return stack buffer.

6. The device of claim 1, wherein the first branch prediction circuitry operates based on the second program counter value when the compute pipeline that operates based on the first program counter value is stalled.

7. The device of claim 1, further comprising:

second branch prediction circuitry that operates based on the second program counter value.

8. The device of claim 7, wherein the second branch prediction circuitry predicts only a specified number of instructions past the next instruction.

9. The device of claim 7, wherein the first and second branch prediction circuitry are configured to operate concurrently and the second branch prediction circuitry promotes an entry from a branch target buffer of the branch target buffers that has a slower access time to a branch target buffer of the branch target buffers that has a faster access time and does not have the entry.

10. The device of claim 1, further comprising:

a victim cache configured to receive an entry that has been evicted from a branch target buffer of the branch target buffers; and wherein the first branch prediction circuitry is configured to access the victim cache responsive to receiving respective miss indications from each branch target buffer of the branch target buffers based on the second program counter value.

11. The device of claim 10, wherein the first branch prediction circuitry is configured to populate a branch target buffer of the branch target buffers with an entry associated with the second program counter value form the victim cache.

12. A method comprising:

storing, by a hierarchy of branch target buffers entries corresponding to branch instructions, the hierarchy of branch target buffers including respective branch target buffers that have progressively slower access times;

generating, by a first program counter, a first program counter value associated with a next instruction of an executing application;

generating, by a second program counter, a second program counter value that is associated with a subsequent instruction of the executing application that is after the next instruction;

moving, by branch prediction circuitry, an entry of a branch target buffer of the branch target buffers to another branch target buffer of the branch target buffers based on the second program counter value; and setting, by the branch prediction circuitry, the second program counter to the first program counter value when a compute pipeline that operates based on the first program counter value is stalled.

13. The method of claim 12, further comprising populating, by the branch prediction circuitry, a branch target buffer of the respective branch target buffers with a faster access time with an entry corresponding to the second program counter value and from a branch target buffer of the branch target buffers with a slower access time.

14. The method of claim 12, further comprising:

storing, by a first branch history register, branch target data associated with most recent branch instructions of the executing application in accord with the first program counter; and storing, by a second branch history register, branch target data associated with most recent branch instructions of the executing application in accord with the second program counter.

15. The method of claim 12, further comprising:

populating a first return stack buffer in accord with the first program counter value; and populating a second return stack buffer in accord with the second program counter value.

16. The method of claim 15, wherein the second return stack buffer stores less data than the first return stack buffer.

17. A device comprising:

a hierarchy of branch target buffers storing entries corresponding to branch instructions, the hierarchy of branch target buffers including respective branch target buffers that have progressively slower access times;

a first program counter configured to generate a first program counter value associated with a next instruction of an executing application;

a second program counter configured to predict a second program counter value that is associated with a subsequent instruction of the executing application and is after the next instruction; and first branch prediction circuitry configured to:

populate a branch target buffer of the respective branch target buffers with a faster access time with an entry corresponding to the second program counter value and from a branch target buffer of the branch target buffers with a slower access time; and set the second program counter to the first program counter value when a compute pipeline that operates based on the first program counter value is stalled.

18. The device of claim 17, further comprising:

a first branch history register that stores branch data associated with most recent branch instructions of the executing application in accord with the first program counter; and a second branch history register that stores branch data associated with most recent branch instructions of the executing application in accord with the second program counter.

19. The device of claim 17, wherein the branch prediction circuitry operates based on the second program counter value when the compute pipeline that operates based on the first program counter value is stalled.

* * * * *